United States Patent [19]
Utigard

[11] 3,806,010
[45] Apr. 23, 1974

[54] SCABBARD MOUNT FOR MOTORCYCLES AND OTHER VEHICLES

[76] Inventor: Norman C. Utigard, P.O. Box 1450, Omak, Wash. 98841

[22] Filed: Sept. 22, 1972

[21] Appl. No.: 291,342

[52] U.S. Cl.............. 224/2 A, 224/29 R, 224/36, 224/41
[51] Int. Cl.................... B60m 9/00, B26b 29/00
[58] Field of Search........ 224/29 R, 41, 39 R, 32 R, 224/35, 2 A, 2 C, 2 D, 2 E, 2 F, 1 R, 36; 150/52 R

[56] References Cited
UNITED STATES PATENTS

| | | | |
|---|---|---|---|
| 2,236,382 | 3/1941 | Roberge | 224/2 D UX |
| 2,538,424 | 1/1951 | Moehle | 224/2 D |
| 2,950,748 | 8/1960 | Olinghouse | 224/29 B UX |

FOREIGN PATENTS OR APPLICATIONS

| | | | |
|---|---|---|---|
| 241,729 | 12/1911 | Germany | 224/41 |
| 601,487 | 3/1926 | France | 224/41 |

Primary Examiner—Albert J. Makay
Assistant Examiner—Jerold M. Forsberg
Attorney, Agent, or Firm—Clarence H. O'Brien; Harvey B. Jacobson

[57] ABSTRACT

A mount including a pair of parallel and opposing channel members is provided with the channel members rigidly braced relative to each other and a connecting strap extending between one pair of corresponding ends thereof. A scabbard for enclosing a rifle, shotgun, chain saw and other implements is provided and is of a configuration to be slidingly received between the channel members in a manner guided by the channel members and the scabbard is seatable against the connecting strap. The mount includes fastening brackets whereby the mount, and thus the scabbard supported therefrom, may be supported from a motorcycle, bicycle or other vehicle. In addition, the scabbard is readily removable and itself provided with flexible straps whereby the scabbard may be secured, by means of the flexible straps, to a vehicle or saddle independent of the mount.

5 Claims, 5 Drawing Figures 3,806,010

SCABBARD MOUNT FOR MOTORCYCLES AND OTHER VEHICLES

The instant invention resides in the provision of a mount for attachment to various vehicles such as motorcycles and bicycles and from which a scabbard for containing long guns and other elongated structures such as a chain saw may be removably supported.

By providing such an apparatus various articles may be supported from various vehicles for ready access thereto.

The main object of this invention is to provide a mount for scabbards which may be utilized in supporting the associated scabbard from a vehicle such as a bicycle, motorcycle or other occupant supporting vehicle.

Another object of this invention, in accordance with the immediately preceding object, is to provide a scabbard for utilization with the mount that is supported therefrom in a readily removable manner.

A still further object of this invention is to provide a removable scabbard in accordance with the immediately preceding object and including its own flexible attaching straps which may be utilized, in lieu of the mount, to support the scabbard from a vehicle or saddle.

A final object of this invention to be specifically enumerated herein is to provide a scabbard mount and scabbard therefor which will conform to conventional forms of manufacture, be of simple construction and easy to use so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
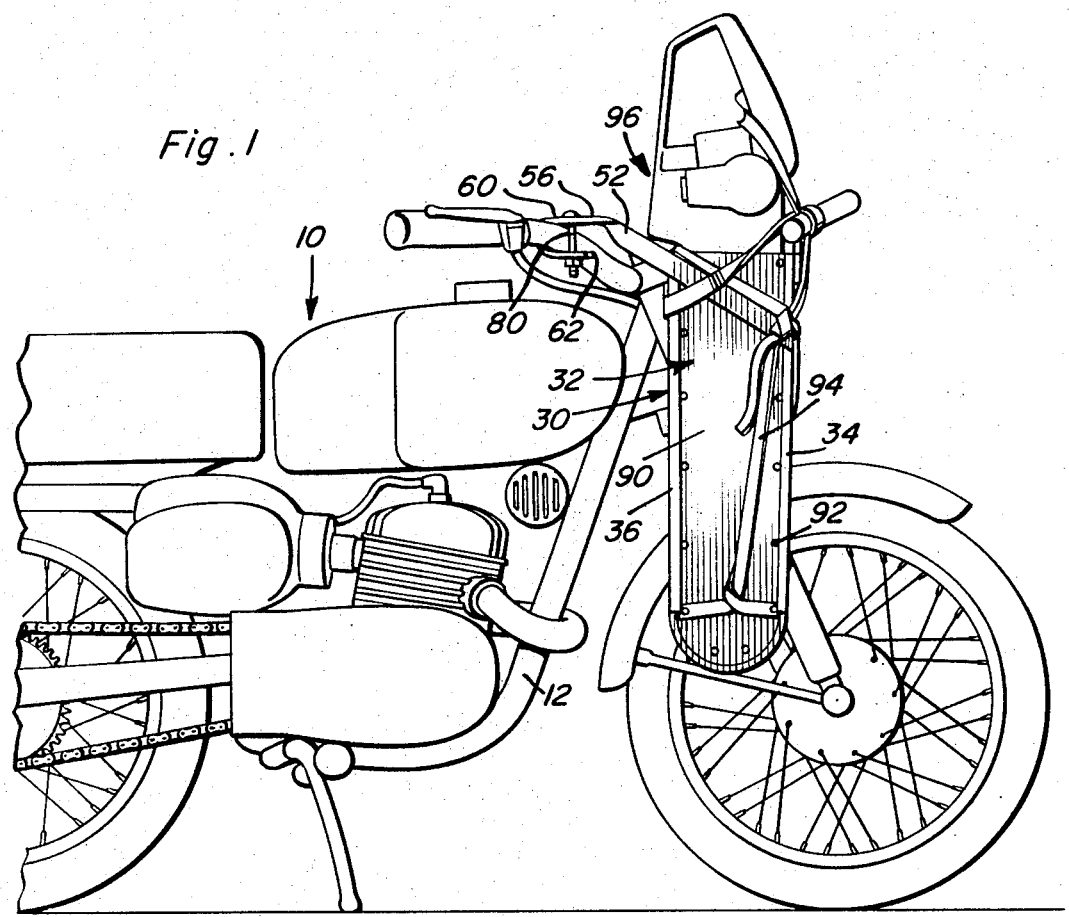
FIG. 1 is a fragmentary perspective view of a lightweight motorcycle with the scabbard mount of the instant invention supported from the motorcycle and a chain saw supporting scabbard removably supported from the scabbard mount.

Referring now more specifically to the drawings, the numeral 10 generally designates a conventional form of lightweight motorcycle including a main frame 12 from the front end of which a combined front fork and handlebar assembly referred to in general by the reference numeral 14 is oscillatably supported. The assembly 14 includes a pair of upper oppositely directed handlebar ends 16 and 18, a pair of upstanding forwardly and downwardly inclined guide tubes 20 and 22 and a pair of elongated upstanding forwardly and downwardly inclined front wheel supporting members 24 and 26 which are telescopingly engaged within the guide tubes 20 and rotatably journal a front wheel assembly 28 between their lower ends.

The foregoing may be considered as a description of a conventional form of motorcycle.

Figure 2:
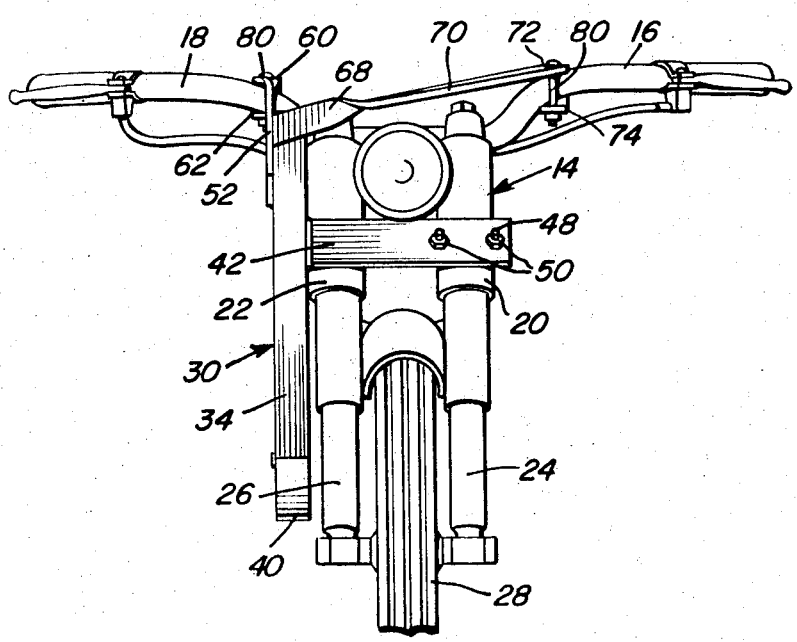
FIG. 2 is a fragmentary front elevational view of the assemblage illustrated in FIG. 1 as seen from the right side thereof.
Figure 3:
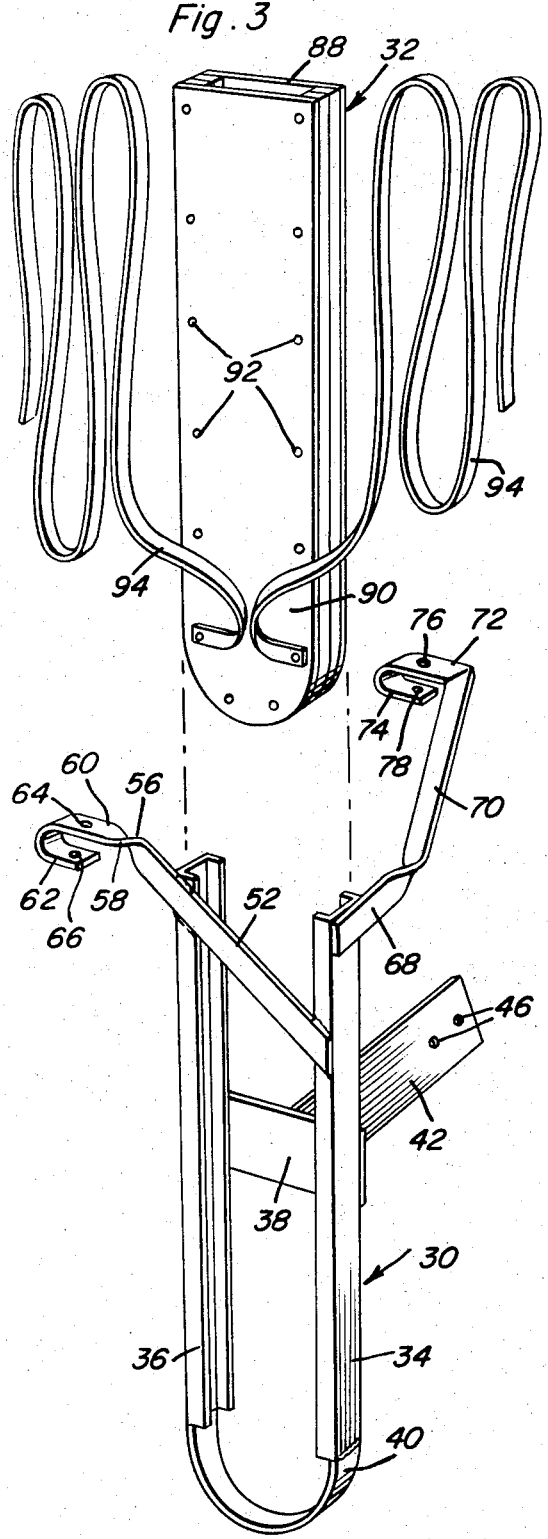
FIG. 3 is an exploded perspective view of the scabbard mount and scabbard combination.
Figure 4:
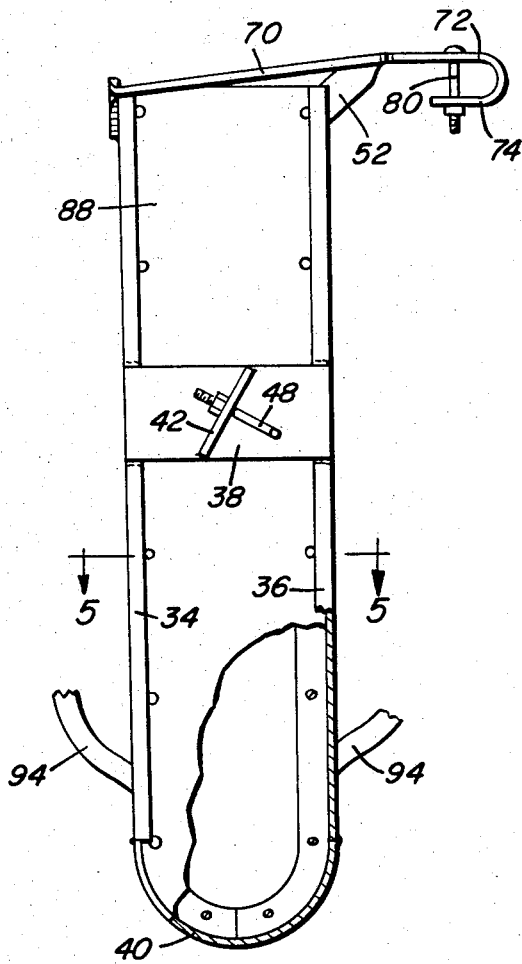
FIG. 4 is a side elevational view of the assembled scabbard mount and scabbard combination.
Figure 5:
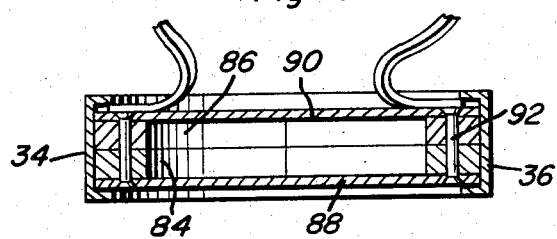
FIG. 5 is an enlarged horizontal sectional view taken substantially upon the plane indicated by the section line 5—5 of FIG. 4.

With reference now more specifically to FIG. 3 of the drawings, the reference numeral 30 generally designates a scabbard mount and the reference numeral 32 generally designates a scabbard. The mount 30 comprises a pair of upstanding substantially parallel and opposing channel members 34 and 36 which are rigidly braced relative to each other by means of a horizontal bracing plate 38 extending between and secured to corresponding side portions of the vertical mid-portions of the channel members 34 and 36. In addition, the channel members 34 and 36 are slightly downwardly convergent and have their lower ends interconnected by means of a semi-cylindrical strap 40 secured to and extending between the lower ends of the channel members 34 and 36. Also, the bracing plate 38 includes a rigid horizontally elongated and outwardly projecting inclined mounting plate 42 which projects outwardly from the side of the bracing plate 38 remote from the channel members 34 and 36. The outer free end of the mounting plate 42 is provided with a plurality of apertures 46 between which the free ends of a U-bolt clamp 48, see FIGS. 2 and 4, are securable by means of threaded fasteners 50.

The channel member 34 has the lower end of a forwardly and downwardly inclined rigid mounting strap 52 secured thereto on the side thereof remote from the bracing plate 38 and the mid-portion of the mounting strap 52 is secured to the corresponding side of the upper end portion of the channel member 36. The upper end portion of the mounting strap 52 includes a 90 degree twist 56 and 45 degree bend 58 so as to define a generally horizontally disposed upper end portion 60 which terminates in a downturned reversely bent terminal end 62, the portion 60 and terminal end 62 being provided with vertically aligned apertures 64 and 66, respectively.

The upper end of the channel member 34 has a lower horizontal end portion 68 of an outwardly directed and upwardly inclined second mounting strap 70 secured thereto. The strap 70 includes a horizontally disposed upper end portion 72 corresponding to the portion 60 and the portion 72 terminates in a downwardly curving reversely bent terminal end portion 74 corresponding to the terminal end 72. The portion 72 and terminal end 74 include vertically registered apertures 76 and 78, respectively, and it may be seen from FIGS. 1 and 2 of the drawings that the scabbard mount 30 is positionable along the right hand side of the assembly 14 with the mounting plate 42 extending across the front side of the lower portions of the guide tubes 20 and the handlebar end 16 received between the portions 74 and 76 and the handlebar end 18 received between the portions 60 and 62. The U-bolt clamp 48 is secured about the guide tube 20 and through the apertures or bores 46 in order to secure the mounting plate 42 to the guide tube 20 and suitable threaded fasteners 80 are secured through the aligned apertures or bores 64 and 66 and 76 and 78 so as to secure the upper end portions of the mounting straps 52 and 70 to the handlebar ends 18 and 16, respectively.

The scabbard 32 includes a pair of side-by-side U-shaped spacing members 84 and 86 constructed of any suitable material such as leather and a pair of opposite side leather panels 88 and 90 are secured to the remote sides of the spacing members 84 and 86 after the latter have been disposed in side-by-side relation, suitable fasteners 92 being secured through the spacing members 84 and 86 and the side panels 88 and 90.

The lower end of the scabbard 32 has one set of corresponding ends of a pair of flexible straps 94 secured to one side thereof by means of the fasteners 92 and the straps 94 may be utilized to secure the scabbard 32 to a supporting structure independently of the scabbard mount 30, or in conjunction with the latter.

As illustrated in FIG. 1 of the drawings, a chain saw referred to in general by the reference numeral 96 may be readily supported from the scabbard 32 with the blade (not shown) of the chain saw 96 snugly received within the scabbard 32. Also, one or both of the straps 94 may be utilized to releasably secure the chain saw 96 in position relative to the scabbard 32. Of course, the scabbard 32 has the legs of its U-shaped spacing members 86 slightly downwardly convergent in the same manner in which the channel members 34 and 36 are downwardly convergent. Therefore, the scabbard 32 seats downwardly within the scabbard mount in a wedging manner in order to insure against accidental displacement of the scabbard 32 from the mount 30.

Although the scabbard 32 is primarily constructed of leather, other suitable materials may be utilized in its construction. In addition, the scabbard mount may be readily constructed of any suitable non-corrosive materials, if desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a vehicle having an upstanding oscillatable front fork assembly including a pair of opposite side forwardly and downwardly inclined elongated members between which a front wheel receiving recess is defined and further including a pair of upper end opposite side handle bar ends projecting outwardly in opposite directions from the remote side portions of the upper ends of said elongated members, an upwardly opening upstanding scabbard mount including inner and outer sides as well as front and rear sides and disposed along the outer side of one of said elongated members remote from the other elongated member with the inner side of the scabbard mount opposing the outer side of said one elongated member, the outer side of said mount including an upwardly and rearwardly projecting mounting strap having its upper rear portion clampingly supported from the handle bar end projecting outwardly from said one elongated member, said mount including a laterally outwardly projecting mounting plate spaced below the upper end of said mount and projecting outwardly from the inner side thereof overlying the front sides of said elongated members, means anchoring the outer end of said mounting plate to the other inclined elongated member, and the upper portion of the front side of said mount including an outwardly projecting and rearwardly directed mounting strap having its rear portion clampingly supported from the handle bar end projecting outwardly from the other downwardly inclined elongated member, and an upwardly opening upstanding scabbard removably downwardly telescoped into said scabbard mount from the upper end thereof.

2. The combination of claim 1 wherein said scabbard mount includes a pair of upstanding front and rear channel members opening toward each other and rigidly interconnected at points spaced vertically therealong, said channel members defining an upwardly opening pocket therebetween in which said scabbard is removably received.

3. The combination of claim 2 including a bracing plate extending between and secured to the inner sides of said channel members at points spaced below the upper ends thereof, said mounting plate being supported from and projecting outwardly from said bracing plate.

4. The combination of claim 3 wherein said upwardly and rearwardly projecting mounting strap includes an end portion thereof remote from the corresponding handle bar end extending between and secured to the outer sides of said channel members.

5. The combination of claim 2 wherein said channel members are downwardly convergent, said scabbard including opposite side edges which are similarly downwardly convergent.

* * * * *